United States Patent [19]

Fessel et al.

[11] 4,408,302

[45] Oct. 4, 1983

[54] WORD PROCESSOR WITH DISPLAY DEVICE

[75] Inventors: Rudolf Fessel, Jever; Karl-Friedrich von Knorre, Varel; Peter Tillich; Gottfried Herbermann, both of Wilhelmshaven, all of Fed. Rep. of Germany

[73] Assignee: Olympia Werke AG, Wilhelmshaven, Fed. Rep. of Germany

[21] Appl. No.: 139,115

[22] Filed: Apr. 10, 1980

[30] Foreign Application Priority Data

Apr. 18, 1979 [DE] Fed. Rep. of Germany ....... 2915673

[51] Int. Cl.[3] ................ G06F 3/14

[52] U.S. Cl. ................ 364/900; 340/709; 340/792

[58] Field of Search ............... 340/709, 724, 726, 792; 364/200 MS File, 900 MS File; 434/169, 201

[56] References Cited

U.S. PATENT DOCUMENTS

| | | | |
|---|---|---|---|
| 3,602,893 | 8/1971 | Hodges | 364/900 |
| 3,787,988 | 1/1974 | Nakajima et al. | 434/201 |
| 3,938,139 | 2/1976 | Day | 340/789 |
| 3,974,493 | 8/1976 | De Cavaignac et al. | 364/900 |
| 4,194,197 | 3/1980 | Bodin | 340/792 |
| 4,203,102 | 5/1980 | Hydes | 340/724 |
| 4,244,031 | 1/1981 | Izushima et al. | 364/900 |

FOREIGN PATENT DOCUMENTS 2742992 3/1978 Fed. Rep. of Germany .

*Primary Examiner*—Eddie P. Chan
*Attorney, Agent, or Firm*—Spencer, Kaye & Frank

[57] ABSTRACT

In a word processing machine which operates to provide text in the form of successive lines of characters, and includes an input keyboard for the input of character representations, a data memory connected for storing such representations, a display device connected to receive such representations from the memory and presenting a horizontally-extending plurality of character display locations the right-hand one of which is an entry location, and a control unit connected for controlling the display provided by the display device in a manner to cause the display device to display at least a portion of a line of characters, with each character appearing, in the order of its input to the keyboard, at an entry location of the display and then shifting to the left in the display upon delivery of each subsequent character to the display, the display device is arranged to present at least one further character display location to the right of the entry location, and the control unit is made operable for causing at least a portion of a line of previously inputted characters to be displayed at adjacent ones of the character display locations, including the further location.

3 Claims, 3 Drawing Figures

FIG.2
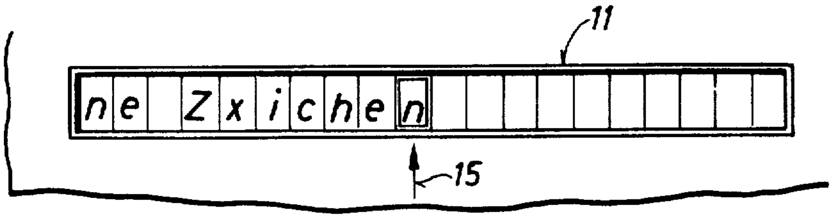
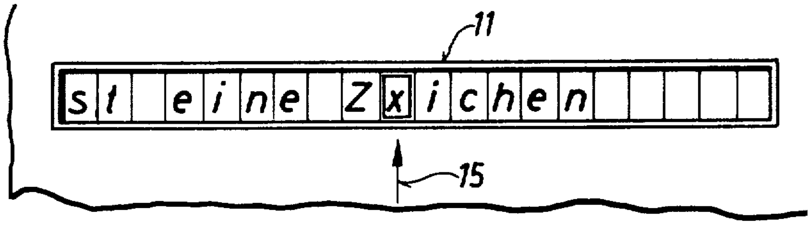
FIG.3

WORD PROCESSOR WITH DISPLAY DEVICE

BACKGROUND OF THE INVENTION

The present invention relates to a word processing machine provided with a display device for displaying lines of text in a line-by-line manner.

German Offenlegungsschrift [Laid-open Application] No. 2,742,992 discloses a word processing device which includes a display device for displaying a section of text. Text characters fed in via a keyboard are displayed in succession in a character input position disposed on the right-hand side of the display device and are shifted to the left by one position with the input of every new character so that the last character fed in is always visible in the extreme right-hand position of the text display region of the display device and the entire text display region shows always the last fifteen, for example, characters fed in. The word processor also includes a data memory in which the fed-in text is stored and from which it is read out and displayed on the display device in sections each composed of fifteen characters.

The display device is provided to afford an opportunity for the operator to correct input errors before the text is printed or to make changes in the text. For this purpose, the text, which is displayed on the display device, must be shifted to the right to such an extent as to bring that part of the text to be corrected or amended in the character input position on the right-hand side of the display device. Special input means are available to the operator for shifting the text and for the various correction and editing procedures. There also exists the possibility of calling out a text contained in a data store and to shift it on the display device until the portion of the text which is to be changed comes to lie in the character input position.

If for purposes of correction a text has been fed in and the portion thereof to be changed has been shifted to the right into the character input position, the text following the portion to be corrected, i.e. the text which had previously been seen on the display device to the right of the portion to be corrected, is no longer visible to the operator. Corrections or editing measures therefore become difficult because the operator cannot see and control the portion of the text to be corrected in context with the text surrounding it. As a result, a typographical error, for example, can be detected only after viewing the entire word or at least the next-following character.

This drawback produces a particularly difficult situation if part of the text, e.g. a word, must be inserted or erased. In this case, the operator will generally have to make a hand-written note because during the correction he does not have a contiguous overview of the text on the display device.

SUMMARY OF THE INVENTION

It is therefore an object of the present invention to improve the control over changes and corrections to be made in texts put into a word processor display device of the above-described type.

This and other objects are achieved, according to the present invention, in a word processing machine which operates to provide text in the form of successive lines of characters, and includes an input keyboard for the input of character representations, a data memory connected for storing such representations, a display device connected to receive such representations from the memory and presenting a horizontally-extending plurality of character display locations the right-hand one of which is an entry location, and control means connected for controlling the display provided by the display device in a manner to cause the display device to display at least a portion of a line of characters, with each character appearing, in the order of its input to the keyboard, at the entry location of the display and then shifting to the left in the display upon delivery of each subsequent character to the display, by arranging the display device to present at least one further character display location to the right of the entry location, and arranging the control means to be operable for causing at least a portion of a line of previously inputted characters to be shifted to the right and displayed at adjacent ones of the character display locations, including the further location.

The present invention offers the advantages, in particular, that changes and corrections in a fed-in portion of text need not be made only in the last position of the text section displayed on the display device but that this text section can be displayed in such a manner that the text to the left as well as to the right of the text portion to be amended or corrected can be seen. The operator of the word processor is thus able to control and read the portion of the text which includes a section to be changed, which significantly simplifies word processing and reduces the number of error inputs.

BRIEF DESCRIPTION OF THE DRAWINGS

FIGS. 2 and 3 are pictorial views of a display device in two operating states according to the invention.

DESCRIPTION OF THE PREFERRED EMBODIMENTS

Figure 1:
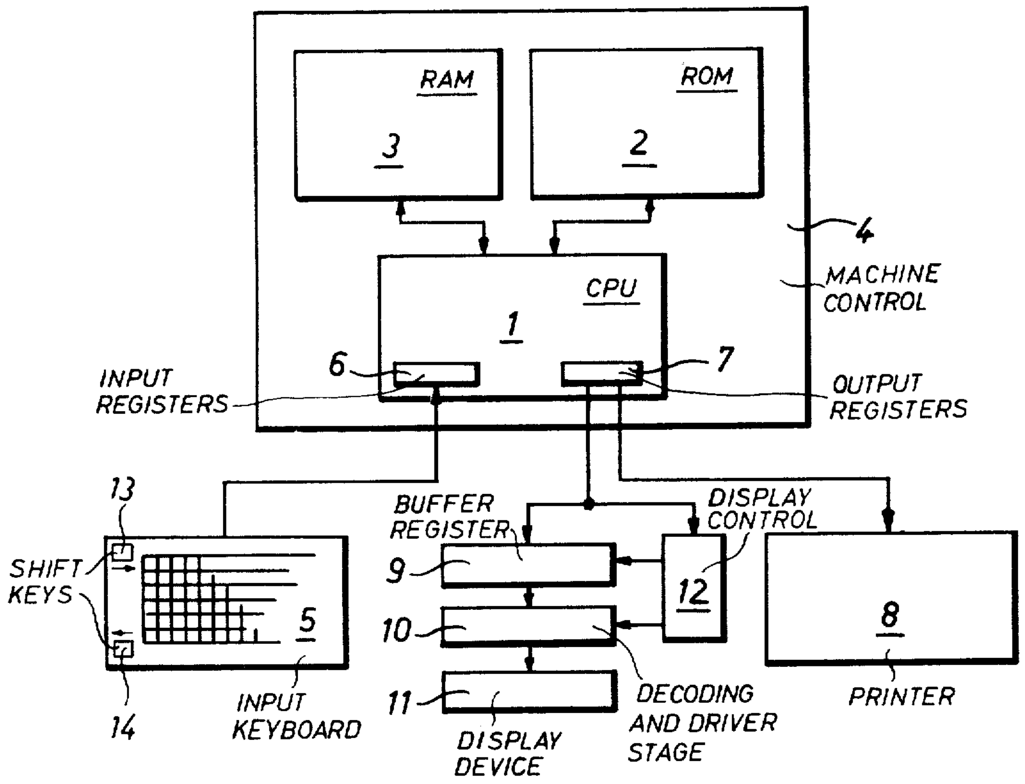
FIG. 1 is a block circuit diagram of a word processor which can incorporate a display device according to the invention.

FIG. 1 shows the components of a word processor which are significant for an understanding of the invention. The word processor includes a microprogram controlled machine control 4 containing a central calculating and control unit (CPU) 1, a microprogram memory (ROM) 2 and a data memory (RAM) 3. The machine control 4 processes, in a known manner, data fed in by means of a keyboard 5 having alphanumeric and function keys and via input registers 6 and reads out data via output registers 7 to a printing mechanism 8 for display on a record carrier.

Additionally, data can be read out via the output registers 7 to be stored in a buffer register 9 and can be fed from register 9 to a decoding and driver stage 10. In the decoding and driver stage 10, the coded data are converted to actuating signals for a display device 11 and those signals are fed to this display device 11 under control of a display control 12 which determines the sequence and frequency of transfer from the buffer register 9 to the decoding and driver stage 10 and the actuation of the display device 11. This actuation function could also be performed directly by the machine control 4 but it has been found to be advisable to reserve the machine control 4 for the actual tasks of word processing and to provide a separate display control for the alphanumeric character display.

Text data fed in by an operator via keyboard 5 are transported under control of CPU 1 and the operating program stored in the microprogram memory 2, as well as under control of the display control 12, to be displayed, character by character, on the display device 11. Different modes of operation can be made available. According to one such mode, the characters which overflow from the display device when the latter is filled are printed out by the printing mechanism 8. Alternatively, the characters can be stored, in addition to being displayed on the display device 11, in coded form in the data memory 3 and can be printed out by the printing mechanism 8 only after they have been read out of the data memory as a result of a special instruction. According to a further alternative, the characters can be displayed on the display device 11 and stored in the data memory 3 without being printed out.

The display device 11 presents a display having the form shown in FIG. 2. Each character punched in by the operator by means of the keyboard 5, is first displayed at a specially designated and identified character entry location 15 of the display device 11, with each character which was previously written in being shifted successively to the left by one position. The display region to the left of the character entry location has been filled by the previously written-in portion, "ist eine Zeichen", of the complete text being fed in, which is "ist eine Zeicheneingabe", so that the first characters, "ist ei", of this text already extend to the left beyond the display region of device 11 and can no longer be seen. At the appearance of the character "n" as shown in FIG. 2, the operator notes that he made a typographical error in the second letter of the word "Zeichen", where he typed in the letter x instead of the desired letter e.

By actuating a shift-to-the-right key 13 in the keyboard 5, the text that was previously put in can be shifted to the right to such an extent that the wrong letter x arrives at character entry location 15, where it can be corrected. This state is shown in FIG. 3.

Since, according to the present invention, further display locations are provided to the right of the character entry location 15, so that the characters "ichen" now located to the right of the character entry location 15 can be displayed, the operator is given an easy way to visually determine which corrective measures to undertake. If these further locations to the right of the entry location 15 were not provided, the operator would have available for a correction control only the text section "st eine Zx" so that he would have to remember exactly what particular correction is to be made. Thus it could happen very easily that he replaces the letter "x" by the letter "a" instead of the letter "e", on the assumption that the word intended was "Zahleneingabe" instead of Zeicheneingabe. The cause of such an error, which has here been selected merely as an example, is eliminated by the manner of displaying provided by the present invention.

During normal input operation, the further locations of the display device 11, disposed to the right of the character entry location 15, need not remain unutilized. In a manner not shown in detail here, they can be used to display reminders for the operator, such as, for example, information about the mode of operation presently selected, errors in processing, or measures required to be taken by the operator. When the text to be corrected is shifted into the further locations provided to the right of the character entry location 15, such operating information is suppressed until these locations are again available for such purpose.

Let it now be assumed that the text already put in has been stored in the data memory 3. While looking over the text printed out as stored, the operator notices the error shown in FIG. 2, i.e. the "x". In this case, the operator has the opportunity of accessing from the data memory 3 the text portion containing the error, by means of search measures known in connection with word processing machines, and can display it on the display device 11. The corresponding instruction for displaying a section of text from memory 3 has the result of causing all display locations of the display device 11 to be available for the display of text so that all display locations are thus utilized.

Actuation of the key 13 again causes the text to be shifted to the right on the display so that the text is displayed in a manner moving toward the right. The actuation of another key 14, a shift-to-the-left key, causes the text to be shifted to the left, thus producing the impression of a text moving toward the left. Appropriate actuation of both keys 13 and 14 enables the operator to align the error containing the text portion on the display device 11 in a simple manner so that the letter to be corrected is again disposed in the specially marked character entry location 15. Here again the text region around the letter to be corrected can be observed so that the letter to be corrected is seen in context by the operator.

It is also possible to display the entire text contained in the data memory 3 on the display device without employing any search functions and then correct the errors contained in it, in that at the appearance of each error the passage of characters is interrupted and the corrective measures are taken in the manner described above.

When a text which has been fed in through the keyboard 5 is displayed directly and has been shifted to the right into the further locations of the display 11 for the purposes of correction, the shift key 14 may also be used, after the correction has been made, to shift the text back to the left so that the portion of the text already put in will be positioned correctly for further text input at character entry location 15. In the example illustrated, the letter "n" is then at location 15.

Even a single further location to the right of the entry location 15 may be of advantage for the above-described utilization for text corrections in recognizing and observing total context, but a larger number of such further locations understandably provides a better aid. It has been found to be advisable to locate the character entry location 15 approximately in the center of the text display area of the display device 11 so that the number of locations to the left of the character entry location 15 is approximately equal to the number of further locations to the right of the location 15. It may further be useful to make the character entry location 15 displaceable by means of special input units so that the ratio of locations to the left of the character entry location 15 in the display device 11 to the number of further locations to the right can be varied.

An exemplary commercially available word processor with associated display device, which would be programmed to operate in accordance with the present invention, is known by the model designation TES 401 electronic typewriter, manufactured by Olivetti & C., S.p.A., Ivrea, Turin, Italy. The programmer would have to redesign the contents of the ROM of the known word processor (corresponding to ROM 2 of FIG. 1) in order to obtain an appropriate operating program. The program would have to activate only a part of the display locations of the display device for the normal displaying of keyboard entered characters, with at least one character display location on the right hand side of the character entry location not being activated for this purpose. And it would have to activate all character display locations of the display device for displaying text, when a shift-to-the-right key or a shift-to-the-left key is actuated. There should be provided two additional keys on the keyboard as shift-to-the-right key and shift-to-the left key. Alternatively the combined actuation of a selected first pair of the existing keys on the keyboard could be interpreted by the program as shift-to-the-right order and of a selected second pair of the existing keys as shift-to-the-left order.

It will be understood that the above description of the present invention is susceptible to various modifications, changes, and adaptations, and the same are intended to be comprehended within the meaning and range of equivalents of the appended claims.

What is claimed is:

1. In a word processing machine which operates to provide text in the form of successive lines of characters, and includes an input keyboard for the input of character representations and special instructions, a data memory connected for storing such representations, a display device connected to receive such representations from the memory and including a horizontally-extending plurality of character display locations the right-hand one of which is an entry location, and control means, connected to said keyboard, said memory and said display device, for controlling the display provided by the display device in a manner to cause the display device to display at least a portion of a line of characters, with each character appearing, in the order of its input to the keyboard, at the entry location of the display and then shifting to the left in the display upon delivery of each subsequent character to the display, the improvement wherein said display device further includes a plurality of further character display location to the right of said entry location; and wherein said control means (a) are responsive to a shift instruction fed in via said keyboard for causing at least a portion of a line of previously inputted characters to be shifted to the right and displayed at adjacent ones of said character display locations, including said further locations, (b) are further operable for controlling transfer, from said data memory to said display device, of representations of characters of text previously fed into said machine in such a manner as to cause the associated characters to be displayed at said character display locations, including said further locations, and (c) are arranged for utilizing said further character display locations, during the performance of character input operations via said keyboard, for displaying non-text information useful to the operator and for suppressing such information when the text is to be displayed in said further locations.

2. An arrangement as defined in claim 1 wherein the number of said further display locations is equal to the number of said display locations to the left of said entry location.

3. An arrangement as defined in claim 1 wherein said control means are responsive to a further instruction signal received via said keyboard for shifting the position of said entry location across said display, whereby the ratio of the number of a said character display locations to the right and to the left of said entry location can be changed.

* * * * *